United States Patent
Streicher (10) Patent No.: US 7,229,512 B2
(45) Date of Patent: Jun. 12, 2007

(54) NON-INVASIVE TEAR MECHANISM FOR FLEXIBLE PACKAGING AND APPARATUS

(76) Inventor: James G. Streicher, 122 Pheasant Run La., Lancaster, NY (US) 14086

( * ) Notice: Subject to any disclaimer, the term of this patent is extended or adjusted under 35 U.S.C. 154(b) by 0 days.

(21) Appl. No.: 10/974,431

(22) Filed: Oct. 27, 2004

(65) Prior Publication Data

US 2005/0087282 A1    Apr. 28, 2005

Related U.S. Application Data

(60) Provisional application No. 60/515,032, filed on Oct. 28, 2003.

(51) Int. Cl.
    *B32B 37/00* (2006.01)
(52) U.S. Cl. .............. 156/73.1; 156/290; 156/580.2; 220/266
(58) Field of Classification Search .......... 156/73.1, 156/252, 290, 580.1, 580.2, 73.3, 257, 510; 53/451, 477, 479, DIG. 2; 493/189, 206, 493/209; 220/265, 266
See application file for complete search history.

(56) References Cited

U.S. PATENT DOCUMENTS

| | | | |
|---|---|---|---|
| 2,499,528 A | 3/1950 | Reitzes | |
| 3,520,471 A | 7/1970 | Faust | |
| 3,687,358 A | 8/1972 | Wink et al. | |
| 4,425,390 A * | 1/1984 | Changani et al. | 428/43 |
| 4,572,753 A * | 2/1986 | Bach | 156/73.1 |
| 4,648,513 A | 3/1987 | Newman | |
| 4,747,895 A * | 5/1988 | Wallerstein et al. | 156/73.3 |
| 5,976,315 A * | 11/1999 | Martin | 156/580.2 |
| 6,074,097 A | 6/2000 | Hayashi et al. | |
| 6,099,670 A * | 8/2000 | Louks et al. | 156/73.1 |
| 6,120,629 A * | 9/2000 | Shannon et al. | 156/73.1 |
| 6,165,298 A * | 12/2000 | Samida et al. | 156/73.1 |
| 6,277,224 B1 * | 8/2001 | Muesch et al. | 156/73.3 |
| 6,379,483 B1 * | 4/2002 | Eriksson | 156/73.1 |
| 6,482,291 B1 * | 11/2002 | Kume et al. | 156/580.2 |
| 2003/0051440 A1 | 3/2003 | Chow et al. | |
| 2003/0169947 A1 | 9/2003 | Taheri | |
| 2003/0215165 A1 | 11/2003 | Hogan et al. | |

* cited by examiner

*Primary Examiner*—James Sells
(74) *Attorney, Agent, or Firm*—Hodgson Russ LLP (57) ABSTRACT

A non-invasive tear mechanism for a flexible packaging, the non-invasive tear mechanism comprises a plurality of junctions formed in the flexible packaging that form a line of weakness in the packaging. The junctions are non-invasive in that the flexible packaging is not cut or scored when the non-invasive tear mechanism is formed. An apparatus for producing a non-invasive tear mechanism in a flexible packaging comprising a carriage, a horn mounted on the carriage, and an anvil having an anvil work surface with a plurality of protuberances extending from it mounted on the carriage. An actuating rod is mounted on the carriage and used for moving the horn and anvil. The protuberances form the non-invasive tear mechanism in the flexible packaging when the horn is activated and the flexible packaging is fused at junctions that correspond with the protuberances.

40 Claims, 6 Drawing Sheets

NON-INVASIVE TEAR MECHANISM FOR FLEXIBLE PACKAGING AND APPARATUS

CROSS-REFERENCE TO RELATED APPLICATION

This application claims the benefit of Provisional U.S. Patent Application No. 60/515,032 to James G. Streicher, filed on Oct. 28, 2003, for a "Non-Invasive Tear Mechanism For Flexible Packaging."

FIELD OF INVENTION

The present invention relates to a tear mechanism for a flexible packaging and an apparatus for creating the tear mechanism.

BACKGROUND

Products and goods oftentimes are packaged in the flexible packaging, which is frequently made of plastic. The flexible packaging is used to hold food products, cement, fertilizer, fluids of all kinds, and other materials.

However, the use of flexible packaging is not without problems. Indeed, many people attempt to open the flexible packaging with their fingers, only to find that the task is very difficult, because the plastic or other material from which the flexible packaging is made has a high tensile strength. The flexible packaging may even stretch before the user gains access to the contents. Such rough handling of the flexible packaging is not desirable because the product housed inside the flexible packaging could be damaged, as is frequently the case when, for example potato chip bags are opened.

In addition, people, in an attempt to open such packaging, have been known to resort to using their teeth to create a break in the flexible packaging. This can cause dental damage. People also resort to using various objects to puncture the flexible packaging, for example a pen or pencil when there is no sharp cutting instrument handy. As a result of using such articles, the person could unintentionally jab himself or herself.

Past attempts to overcome this problem have made use of expensive materials and fabrication techniques. For example, lasers have been used in an attempt to burn the flexible packaging in order to create a way to gain access to the interior of the flexible packaging. However, lasers typically burn completely through the flexible packaging and are difficult to control. Thus, the laser undesirably causes invasive openings to be formed in the flexible packaging. In addition, lasers are dangerous, especially in a factory setting, and they are expensive to purchase and require expensive support equipment.

Thus, there is a need for a tear mechanism for flexible packaging that is inexpensive. There is a need for the tear mechanism be to reproducible, such that the flexible packaging having the tear mechanism can be mass produced. Also, there is a need for the tear mechanism to be easy to manually open, so that the need for scissors and knives is eliminated. Also, the tear mechanism has to be such that it does not compromise the seal of flexible packaging containing, for example, perishable items. Additionally, there is also a need for an apparatus that can form the tear mechanism in the flexible packaging.

SUMMARY

The present invention satisfies the above-described needs by providing a non-invasive tear mechanism for flexible packaging that is formed by an apparatus comprising an ultrasound horn and anvil. The tear mechanism is non-invasive in that there is no hole, opening, or scoring of the flexible packaging. The flexible packaging comprises a horn side wall and an anvil side wall which are joined together, and the non-invasive tear mechanism is formed in the flexible packaging. The non-invasive tear mechanism comprises spaced apart junctions that are formed in a substantially straight line in the flexible packaging. Thus, the spaced apart junctions form a line of weakness in the flexible packaging, such that when the bag is torn in the vicinity of the spaced apart junctions it tears along a substantially straight line defined by the junctions.

The invention also includes an apparatus used for making the non-invasive tear mechanism in a flexible packaging or bag. The apparatus comprises a carriage, an ultrasonic horn joined to and carried by the carriage, and an anvil joined to and carried by the carriage. The anvil has a work surface. The horn further comprises a transducer and a booster. The anvil is movable toward and away from the ultrasonic horn by a limiting actuator, for example a pneumatic, hydraulic, mechanical, or electrical actuator. An actuating rod is provided and the anvil defines a cavity used for receiving the actuating rod therein. The actuating rod used for reciprocating the anvil toward and away from the ultrasound horn. The apparatus also has a guiding post and the anvil defines an opening into which the guiding post is received so that the anvil is guided by the guiding post when it is reciprocated by the actuating rod.

A pattern of protuberances extends from the anvil work surface. The pattern of protuberances extending from the anvil work surface is used for creating the non-invasive tear mechanism in the flexible packaging, when the anvil work surface and ultrasonic horn are moved into position-on both sides of the flexible packaging and the ultrasonic horn is activated. In particular, the pattern of protuberances formed in the anvil work surface is used for producing the spaced apart junctions in the flexible packaging that form a line of weakness in the in the flexible packaging. The flexible packaging can be manually torn open along the line of weakness by applying shearing force or tension force to the flexible packaging at the line of weakness. Knives and scissors are not required to gain access to the interior of the flexible packaging.

It is noted that the line of weakness is not so weak that the product contained within the flexible packaging bursts out of the flexible packaging during the normal handling of the flexible packaging by a user.

It is further noted that the tear mechanism is non-invasive in that there are no punctures or openings formed in the tear mechanism or in the vicinity of the tear mechanism, and there are no score lines or openings in either of the horn side wall or anvil side wall of the flexible packaging. Thus, product housed inside the flexible packaging cannot escape out of the flexible packaging to the surrounding environment through the non-invasive tear mechanism. Likewise, contaminants from the outside environment cannot seep into the flexible packaging through the non-invasive tear mechanism and contaminate the product stored therein. This advantageously keeps the product inside the flexible packaging sterile, regardless of the outside environment conditions.

The protuberances in the pattern of protuberances can have various shapes, for example an X-shape, a circle, a diamond, a rectangle, a polygon, and similar shapes. The pattern of protuberances extending from the anvil work surface can all be the same shape, or could have a number of different shapes. Additionally, the pattern of protuberances can be otherwise arranged, for example in a curve. In such an embodiment, the non-invasive tear mechanism would comprise junctions that together are arranged in a curved shape, thus forming a curve of weakness in the flexible packaging.

BRIEF DESCRIPTION OF THE DRAWINGS

The invention is illustrated in the drawings in which like reference characters designate the same or similar parts throughout the figures of which.

DETAILED DESCRIPTION

At the outset, it noted that like reference numbers are intended to identify the same structure, portions, or surfaces consistently throughout the figures.

Figures 1A, 1B:
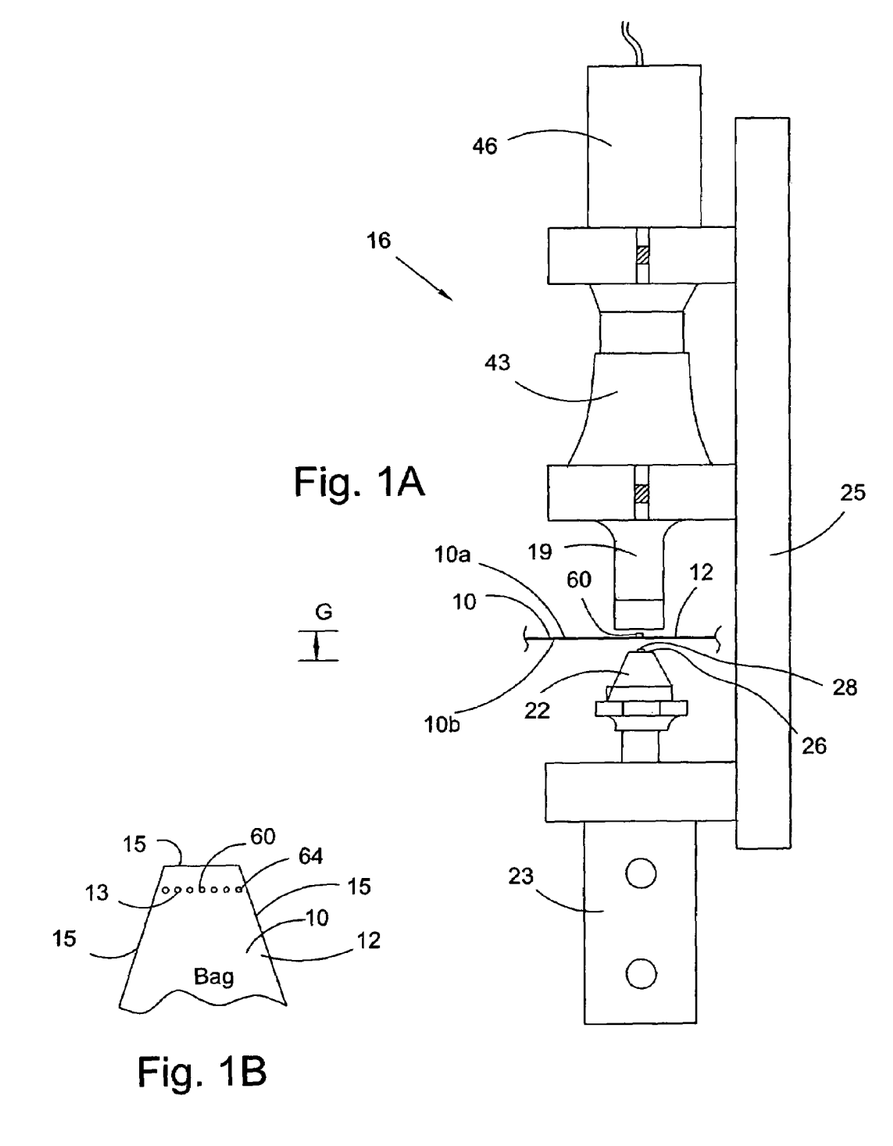
FIG. 1A is a front elevational view of an apparatus for producing the non-invasive tear mechanism.
FIG. 1B is a top plan view of a portion of a flexible packaging having the non-invasive tear mechanism.
Figure 7:
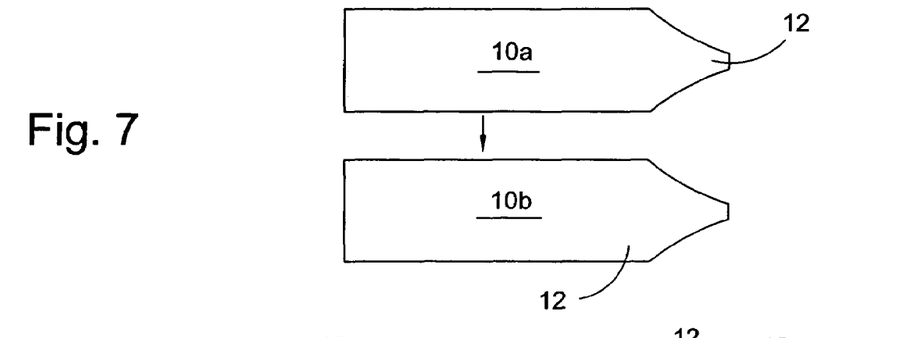
FIG. 7 is a perspective view of the horn side wall of the flexible packaging and anvil side wall of the flexible packaging before they are joined to form the flexible packaging.
Figure 7A:
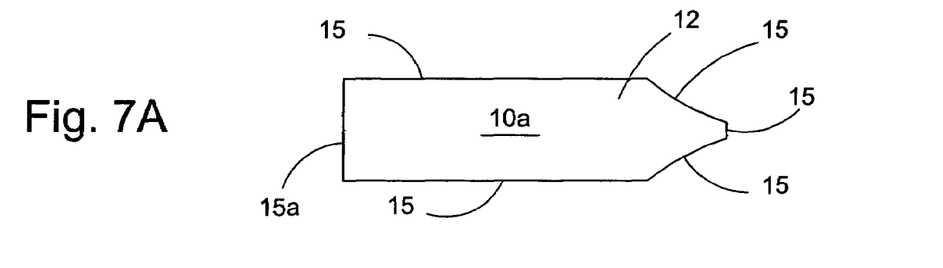
FIG. 7A is a top plan view of the flexible packaging having a fill opening.

Referring generally to FIGS. 1–6 and initially to FIGS. 1A, 7 and 7A, a bag or flexible packaging 10 is provided. The flexible packaging 10 has a horn side wall 10a and an anvil side wall 10b which are joined together along a peripheral junction 15. There is a fill opening 15a in the peripheral junction 15 where the horn side wall 10a and anvil side wall 10b are not joined. The fill opening 15a, shown in FIG. 7A, is used for filling the flexible packaging 10 with product 100 as will be described presently.

Figure 2:
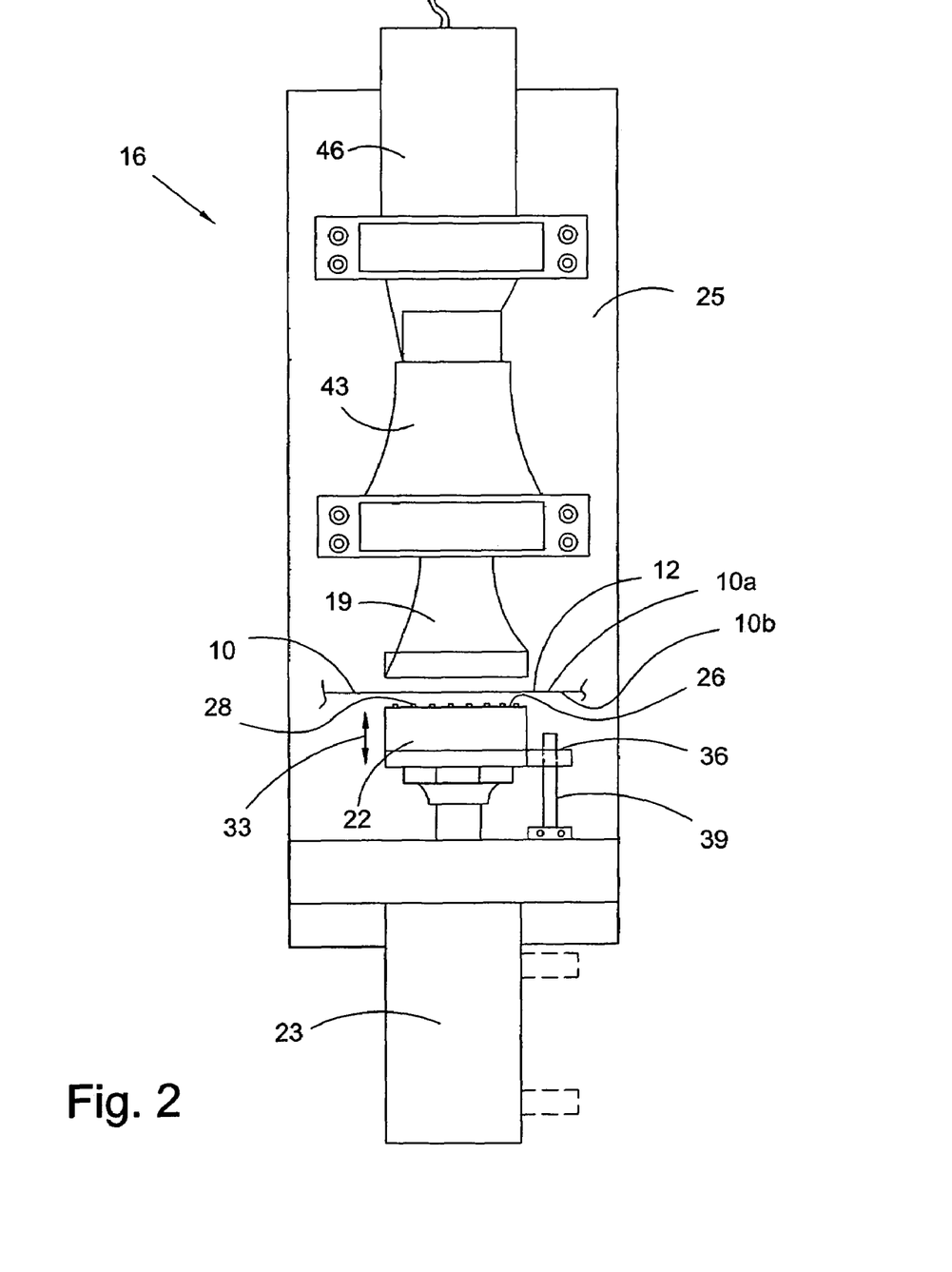
FIG. 2 is a side elevational view of the apparatus for producing the non-invasive tear mechanism.

A non-invasive tear mechanism 13 (FIG. 1B) is formed in the flexible packaging 10 by an apparatus 16 (also referred to herein as system) as shown in FIGS. 1A and 2A. The tear mechanism 13 is non-invasive in that there is no hole, scoring, or opening associated with the tear mechanism 13 in the flexible packaging 10. That is, there is no hole, opening or scoring made in the horn side wall 10a or in the anvil side wall lob of the flexible packaging 10 when the non-invasive tear mechanism 13 is formed. Thus, the material 12 from which the flexible packaging 10 is made retains its integrity, and nothing from the surrounding environment can enter the flexible packaging 10 through the non-invasive tear mechanism 13, and nothing from the interior of the flexible packaging 10 can escape into the surrounding environment through the non-invasive tear mechanism 13. The non-invasive tear mechanism 13 is thus suitable for use in flexible packagings 10 used for holding perishables such as food products, as well as non-perishable goods, for example cement or fertilizer.

The flexible packaging 10 can be made out of a plurality of different materials 12 including, but not limited to, plastics, plastic films, plastic films made out of low density polyethylene (LDPE), high density polyethylene (HDPE), polyester (PET), oriented polypropylene (OPP), biaxially oriented polypropylene (BOPP), nylon, biaxially oriented nylon, and laminated materials such as poly to poly, prop to poly, nylon to poly, prop to prop, pet to poly, and the like. The materials 12 may include 3, 5, and 7 layer coextruded films including substrates formed out of any of the materials set forth above. The plastic film may also comprise polyolefin.

The material 12 comprises films having a thickness of about 1.5 mil to about 4.0 mil. Thus, the horn side wall 10a and anvil side wall 10b may each comprise a thickness of about 1.5 mil to about 4.0 mil. As will be evident to those of ordinary skill in the art, other materials and the thicknesses of the horn side wall 10a and anvil side wall 10b may also be suitable for use in the present invention in other applications.

As shown in FIGS. 1A and 2, the non-invasive tear mechanism 13 is produced by an ultrasonic horn 19 and an anvil 22. In a preferred embodiment, the horn 19 and anvil 22 are mounted on a carriage 25 which provides for adjustment of the position of the horn 19 and anvil 22 in all axes. There is a gap, designated G in FIG. 1, defined between the horn 19 and the anvil 22. The anvil 22 also has a work surface 26 and a pattern of protuberances 28 extends from the work surface 26 of the anvil 22. In a preferred embodiment, the pattern of protuberances 28 is formed in a substantially straight line. As will be described presently, the pattern of protuberances 28 can be otherwise embodied.

In order to produce the non-invasive tear mechanism 13 in the flexible packaging 10, the flexible packaging 10 is moved into position in the gap designated G defined between the horn 19 and the anvil 22. The flexible packaging 10 may be brought into position manually or by use of a conveyor (not shown). Conveyors and the use of conveyors to move and position sheets and films of material 12 is well known to those having ordinary skill in the art.

Figure 4:
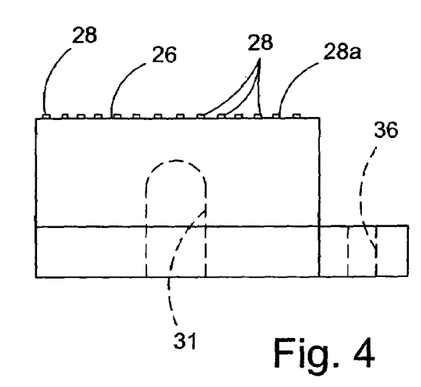
FIG. 4 is a side elevational view of the anvil of the apparatus for producing the non-invasive tear mechanism.
Figure 5:
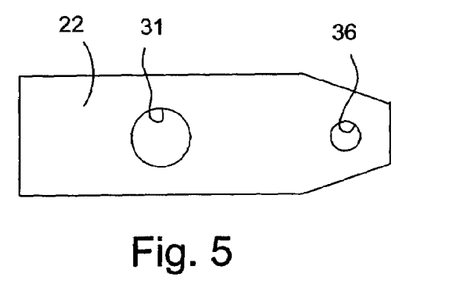
FIG. 5 is a bottom plan view of the anvil of the apparatus for producing the non-invasive tear mechanism.

The work surface 26 of the anvil 22 is brought into position adjacent the anvil side wall 10b of the flexible packaging 10. The anvil 22 is brought into position by an actuator cylinder 23 that houses an actuating rod 23a which is received in a cavity 31 defined in the anvil 22, as shown in FIGS. 1, 2, 4 and 6. The actuator cylinder 23 can be hydraulic, pneumatic, or mechanical, such actuator cylinders 23 well known to those having ordinary skill in the art. The actuator cylinder 23 is joined to the carriage 25. FIG. 4 shows the anvil 22 is provided with a cavity 31 for attachment to an actuating rod 23a that is actuated by the above-described actuator 23 for moving the anvil in the direction of arrow 33 (FIG. 2).

In other embodiments, the anvil 22 and horn 19 may be brought together by a means for positioning that moves the horn 19 and anvil together 22 with a scissors type action, or mechanical moves the horn 19 and anvil 22 together.

The anvil 22 may also be provided with an opening 36 to provide a guide for maintaining the alignment of the anvil 22 during its reciprocating motion as it forms the non-invasive tear mechanisms 13. The anvil 22 slides back and forth along a post 39 (FIG. 2) by means of the opening 36 defined in the anvil 22 to maintain alignment.

In a preferred embodiment, the horn 19 is part of a 20 kilohertz (kHz) heavy duty ultrasonic probe including a titanium booster 43, a transducer 46, and a titanium horn assembly. One example of this type of probe is Model No. 41C30, available from Dukane Corporation, located in St. Charles, Ill. Other ultrasonic horns and frequencies may also be suitable. For example, in other embodiments, the ultrasonic frequency may be in the range of between about 20 kHz to about 80 kHz. It is noted that the ultrasonic horn 19 functions by generating heat from high frequency mechanical motion, and this heat is used for fusing layers of material 12 together. Ultrasonic horns well are known to those having ordinary skill in the art.

Then, once the horn 19 and anvil 22 are brought together, the horn 19 is actuated and generates an ultrasonic pulse. The ultrasonic pulse causes the layers (horn side wall 10a and anvil side wall 10b) of the flexible packaging 10 that is positioned between the horn 19 and anvil 22 to fuse together in a pattern corresponding to the pattern of protuberances 28 disposed on the work surface 26 of the anvil 22. Thus, the anvil side wall 10b and horn side wall 10a are fused together at each protuberance 28a in the pattern of protuberances 28. Where the horn side wall 10a and anvil side wall 10b are fused together in this manner, junctions 60 are formed in the flexible packaging 10.

The junctions 60 are spaced apart, and each junction 60 corresponds with a protuberance 28a that extends from the anvil work surface 26. It is noted that there is no opening, hole, scoring, or slit in the flexible packaging or bag 10 after the non-invasive tear mechanism 13 has been formed in the above-described manner.

Figure 3:
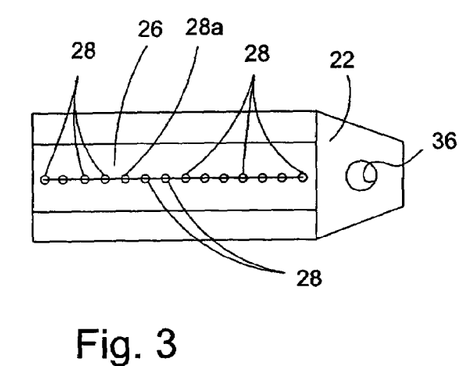
FIG. 3 is a top plan view of the anvil of the apparatus for producing the non-invasive tear mechanism.
Figure 6:
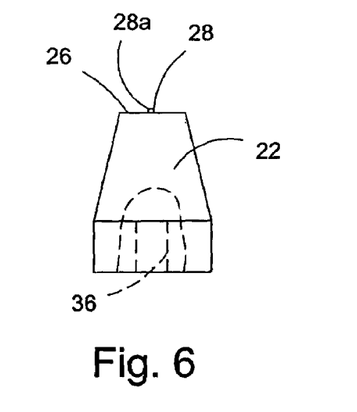
FIG. 6 is an end elevational view of the anvil of the apparatus for producing the non-invasive tear mechanism.

The spaced apart junctions 60 are in a substantially straight line, as shown in FIG. 3, and form a line of weakness 64 in the in the flexible packaging 10. The junctions 60 are formed in this substantially straight line because, as shown in FIGS. 2, 3, and 6, the pattern of protuberances 28 extending from the work surface 26 of the anvil 22 is in a substantially in a straight line.

It is noted that the horn 19 and anvil 22 do not contact one another when the junctions 60 are formed in the flexible packaging 10.

It is noted that in other embodiments, the ultrasonic horn may be replaced with a hot knife, a heated tool, a microwave generation device, or a radio frequency generating device, so long as it can fuse the horn side wall 10a and the anvil side wall 10b at the junctions 60. Such devices are well known to those having ordinary skill in the art.

Figure 7B:
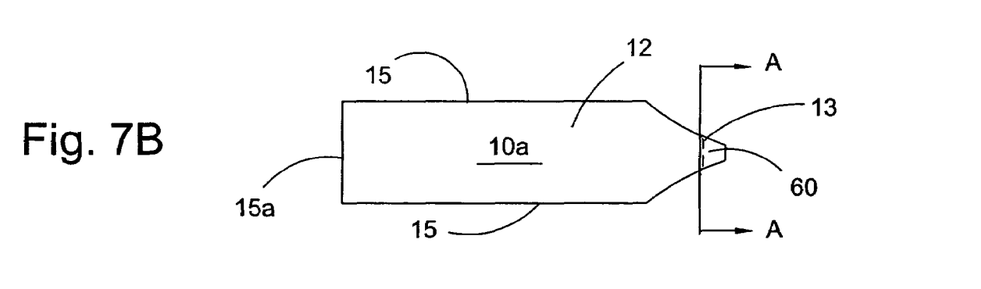
FIG. 7B is a top plan view of the flexible packaging having a non-invasive tear mechanism.
Figure 7C:
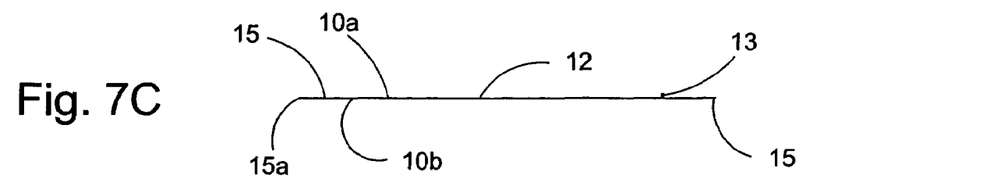
FIG. 7C is a front elevational view of the flexible packaging having a non-invasive tear mechanism.
Figure 7D:
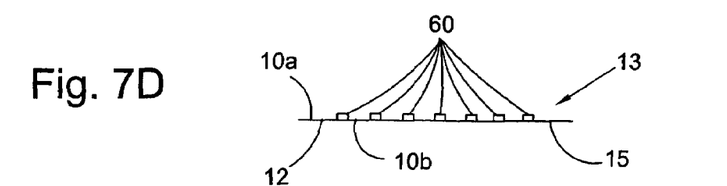
FIG. 7D is a right side elevational view of the flexible packing having a non-invasive tear mechanism.
Figure 7E:
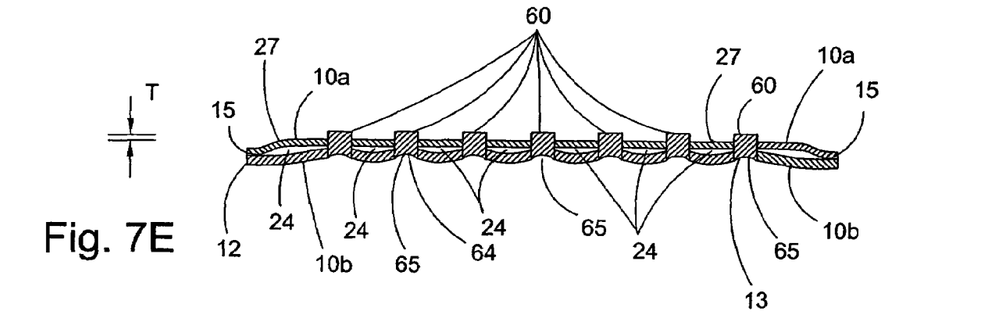
FIG. 7E is a sectional view of the non-invasive tear mechanism taken along cut line A—A of FIG. 7B.
Figure 7F:
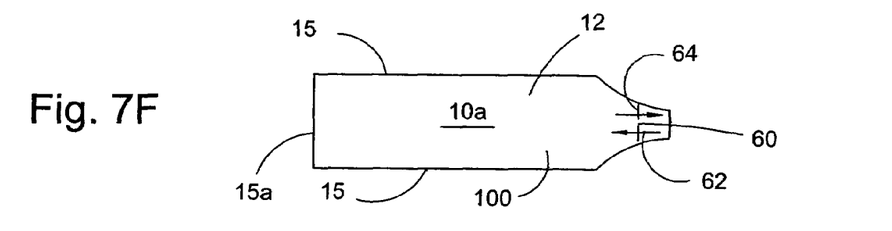
FIG. 7F is a top plan view of the flexible packaging having a non-invasive tear mechanism loaded with product, showing the movement of product between junctions.
Figure 7G:
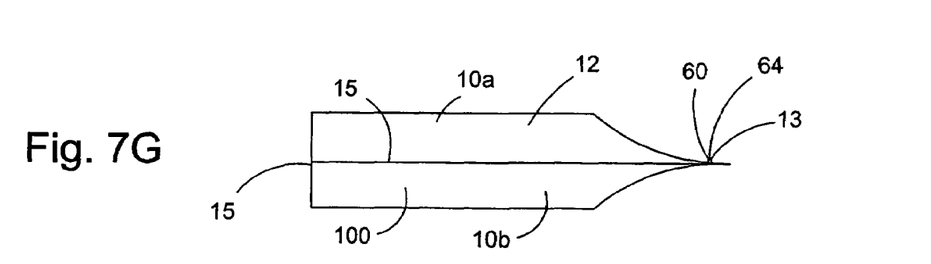
FIG. 7G is a front elevational view of the flexible packaging having a non-invasive tear mechanism loaded with product.
Figure 7H:
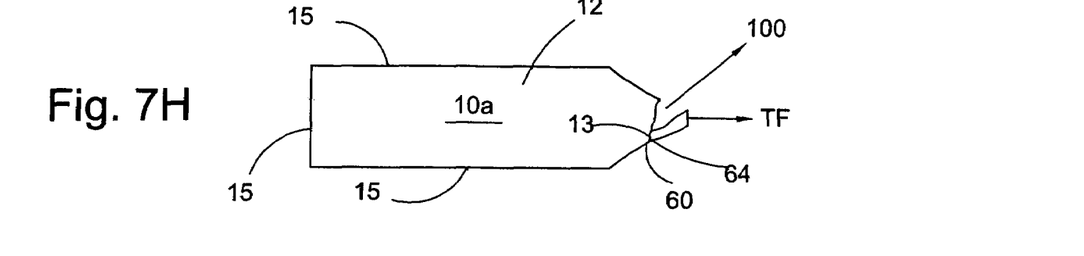
FIG. 7H is a top plan view of the flexible packaging loaded with product wherein the non-invasive tear mechanism is shown partly torn by a tension force.
Figure 7I:
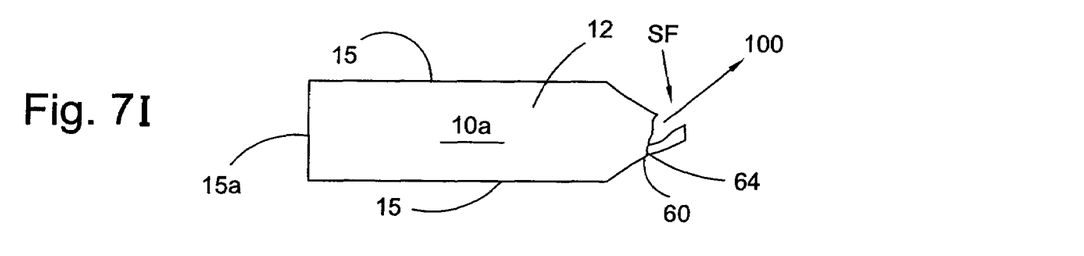
FIG. 7I is a top plan view of the flexible packaging loaded with product wherein the non-invasive tear mechanism is shown partly torn by a shearing force.
Figure 7J:
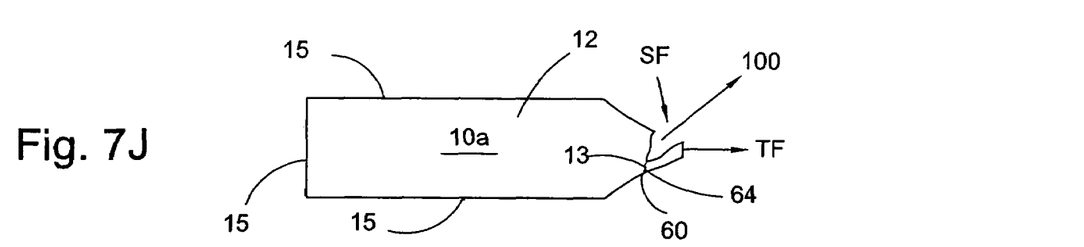
FIG. 7J is a top plan view of the flexible packaging loaded with product wherein the non-invasive tear mechanism is shown partly torn by both tension and shearing forces.

To open the flexible packaging 10, the line of weakness 64 is subjected to manually applied shearing forces as indicated by arrow SF in FIG. 7I, tensions forces as indicated by arrow TF in FIG. 7H, or a combination of shearing and tension forces as shown in FIG. 7J. The flexible packaging 10 will tear along the line of weakness 64 when such forces are applied, and the interior of the flexible packaging 10 can thus be accessed in this manner.

Shown in FIG. 3 is a preferred embodiment wherein the pattern of protuberances 28 is linear. Such a linear arrangement produces a substantially linear arrangement of junctions 60 in the flexible packaging 10 and a substantially linear line of weakness 64. Additionally, each protuberance 28a has a geometrical shape. In a preferred embodiment the each protuberance 28a in the pattern of protuberances 28 is X-shaped.

The non-invasive tear mechanism 13 thus advantageously allows food products, fluids, pastes, non-food products, cement, and the like to be stored internally in the flexible packaging 10 without leaking out of the non-invasive tear mechanism 13 to the surrounding environment. At the same time, environmental contaminants, fluids, and substances cannot move, migrate, seep, or flow into the interior of the flexible packaging 10 through the non-invasive tear mechanism 13. It is noted that the line of weakness 64 is not so weak that the product 100 housed in the flexible packaging 10 bursts out of the flexible packaging 10 during the normal handling of the flexible packaging 10 by a user.

FIGS. 7–7J show the method of forming the non-invasive tear mechanism 13, and opening the non-invasive tear mechanism 13. FIG. 7 shows the horn side wall 10a and the anvil side wall 10b before they are joined to form the flexible packaging 10. FIG. 7A shows the anvil side wall 10a and a horn side wall 10b joined along a peripheral junction 15. There is a fill opening 15a in the peripheral junction 15 where the horn side wall 10a and anvil side wall 10b are not joined. The peripheral junction 15 can be formed by conventional means known to those having ordinary skill in the art, for example by ultrasonic welding. The fill opening 15a is used for allowing access to the interior of the flexible packaging 10, so that the flexible packaging 10 can be loaded or filled with product 100 after the non-invasive tear mechanism 13 has been formed in the flexible packaging 10.

Then, the non invasive tear mechanism 13, as shown in FIG. 7B, is formed in the flexible packaging 10 in the manner described above by moving the flexible packaging 10 between the anvil 22 and horn 19 and closing the two together, and activating the horn 19. FIG. 7C shows a side elevational view of the flexible packaging 10, showing the non-invasive tear mechanism 13 extending from the horn side wall 10a. FIG. 7E shows a sectional view of the non-invasive tear mechanism 13 taken along cut line A—A of FIG. 7B. The junctions 60 of the non-invasive tear mechanism 13 each extend a distance, designated T in FIG. 7E, above the exterior surface 27 horn side wall 10a of the flexible packaging 10. In a preferred embodiment, the distance T may be between about 20 percent to about 30 percent of the combined thicknesses of the horn side wall 10a and anvil side wall 10b. Accordingly, there are recesses 65 formed in flexible packaging 10 at the junctions 60, as shown in FIG. 7E. In other embodiments, the distance T could be more or less depending on a particular application or particular customer order. FIG. 7D is a right side elevational view of the flexible packaging 10 and the non-invasive tear mechanism 13.

After the non-invasive tear mechanism 13 has been formed in the flexible packaging 10, the flexible packaging 10 is loaded or filled with product 100 though fill opening 15a. The filling process can be part of an automated assembly line wherein product is automatically loaded into the flexible packaging 15, such automatic loading of flexible packaging 10 known to those having ordinary skill in the art. After filling the flexible packaging 10, the fill opening 15a is closed or sealed. The sealing can be by way of conventional means, for example ultrasonic welding. FIGS. 7F–7J all show the sealed flexible packaging 10 loaded with product 100.

After the flexible packaging 10 is loaded and sealed, external contaminates cannot gain access to the interior of the flexible packaging 10 through the non-invasive tear mechanism 13, because the non-invasive tear mechanism 13 does not have any no holes, openings, or scoring. Likewise, product 100 housed in the flexible packaging 10 interior cannot move out of the flexible packaging 100 through the non-invasive tear mechanism 13, since there are no openings, holes, or score lines. Thus, there is no way for product 100 to leak out of the packaging 10, and there is no way for contaminates to seep into the flexible packaging 10 through the non-invasive tear mechanism 13.

FIG. 7E is a sectional view taken along cut line A—A of FIG. 7B. As shown in FIG. 7F, product 100 internal to the flexible packaging 10 is free to move between the junctions 60 that form the line of weakness 64 as indicated by the arrows 62 shown between the junctions 60. This is due to the fact the junctions 60 that join the horn side wall 10a and anvil side wall 10b are at spaced intervals that mimic the pattern of protuberances 28 formed in the anvil 22 work surface 26. Thus, where the non-invasive tear mechanism 13 is formed in the flexible packaging 10, spaces 24 are defined by the horn side wall 10a, the anvil side wall 10b, and the junctions 60. Product 100 can thus move between the spaced apart junctions 60 through these spaces 24, but the product 100 remains internal to the flexible packaging 10 until the non-invasive tear mechanism 13 is torn.

As shown in FIGS. 7I–7J, to open the flexible packaging 10, the user applies tension force TR, or shearing force SF, or a combination of both to the flexible packaging 10 in the vicinity of the noninvasive tear mechanism 13. When force is applied to flexible packaging 10 at the non-invasive tear mechanism 13, the non-invasive tear mechanism 13 tears at the junctions 60 and along the line of weakness 64. The flexible packaging 10 is thus easily opened without the use of scissors or knives.

In other embodiments, the geometrical shape of each protuberance 28a and the spacing between each protuberance 28a may be varied infinitely. For example, the shapes of each of the protuberances 28 may include dots, squares, polygons, diamonds, stars, X-shapes, or the like. The distances between each of the protuberances 28a can be as shown in the figures, or the distance may be more or less, depending on the particular application or customer requirement. All of these embodiments are within the scope of the present invention.

Figure 8A:
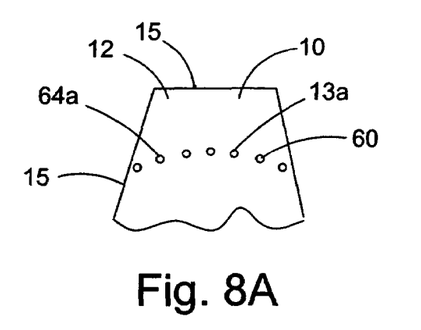
FIG. 8A is a top plan view of a flexible packaging have a non-invasive tear mechanism having a curved shape.
Figure 8B:
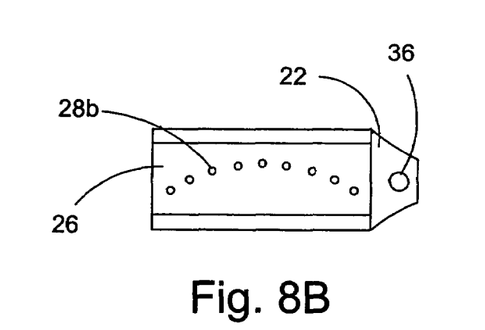
FIG. 8B is a top plan view of the anvil used for producing the non-invasive tear mechanism having a curved shape.

Another embodiment is shown in FIGS. 8A and 8B. The pattern of protuberances 28b extends from the working surface 26 of the anvil 22 in a curved arrangement, as shown in FIG. 8B. FIG. 8A is a top plan view of a flexible packaging 10 having a non-invasive tear mechanism 13a made with the anvil 22 having the curved pattern of protuberances 28b. As shown, the non-invasive tear mechanism 13a comprises junctions 60 which are formed in a curved shape thus forming a curve of weakness 64a in the flexible packaging 10.

In other embodiments the flexible packaging 10 can be rectangular shaped, circular shaped, triangular shaped, or may have any shape as required for a particular application.

Advantageously, the non-invasive tear mechanism 13 can be used for ensuring food safety. For example, the typical loaf of bread sold at a store comes in a bag that has a simple wire tie that is used for sealing the open end of the bag. The other end of the bag is sealed by conventional means, for example ultrasonic welding. However, anyone could unwind the twist tie and open the bread bag and contaminate and/or tamper with the bread, and then re-wind the twist tie around the bread bag. No one would be able to detect this undesirable food tampering. Such activity cannot be carried out if the bread is sealed in flexible packaging 10 employing the non-invasive tear mechanism 13. For example, if the bread is loaded into a flexible packaging 10 having the non invasive tear mechanism 13, it would be impossible for someone to tamper with the bread undetected, because the non-invasive tear mechanism 13 would be torn. The non-invasive tear mechanism 13 can thus advantageously alert consumers of possible product tampering. The bread bag having a non-invasive tear mechanism 13 could be used in combination with tradition wire ties, so that an end user could manually open the non-invasive tear mechanism 13 to access the bread, and then use the wire tie to keep the bread bag closed thereafter. Thus, the non-invasive tear mechanism 13 advantageously allows for tamper resistant food storage.

The non-invasive tear mechanism 13 also advantageously decreases the likelihood of worker injury in the food, restaurant, and fast food industries, and advantageously decreases the likelihood of food contamination. For example, the flexible packaging 10 could be loaded with condiments, frostings, sauces, and the like. A worker could quickly and easily manually open the flexible packaging 10 in the above-described manner by manually tearing the non-invasive tear mechanism 13. The worker does not need a knife, scissors, or any other sharp instrument to open the flexible packaging 10. As a result, the likelihood of a worker being injuring trying to open product containers is decreased, and the likelihood of a the product becoming contaminated while the worker attempts to open the product packaging is decreased. Thus, the non-invasive tear mechanism 13 advantageously eliminates the need for knives, scissors, and other dangerous instruments to open the flexible packaging 10. As a result, the non-invasive tear mechanism 13 provides for a safer and more sanitary workplace.

It is noted that a flexible packaging 10 having the non-invasive tear mechanism 13 can be used for holding non-food materials too. For example, the flexible packaging 10 can hold cement, fertilizers, rock salt, chemical solutions, paint, fluids, and pastes.

While the non-invasive tear mechanism 13 has been described in connection with certain embodiments, it is not intended to limit the scope of the non-invasive tear mechanism to the particular forms set forth, but, on the contrary, it is intended to cover such alternatives, modifications, and equivalents as may be included within the spirit and scope of the non-invasive tear mechanism as defined by the appended claims.

What is claimed:

1. A system for forming a non-invasive tear mechanism in a flexible packaging having a horn side wall joined to an anvil side wall, the system comprising:
   a) a carriage,
   b) a horn joined to the carriage the horn capable of generating an ultrasonic pulse when it is actuated,
   c) an anvil joined to the carriage and axially aligned with the horn and the anvil having an anvil work surface,
   d) an actuator joined to the carriage and used for moving the horn and anvil together and apart,
   e) a pattern of protuberances disposed on the anvil work surface for forming the non-invasive tear mechanism in the flexible packaging when the horn and anvil are brought together and the horn generates the ultrasonic pulse causing the horn side wall and the anvil side wall to fuse at spaced apart junctions that correspond with each protuberance in the pattern of protuberances to form a line of weakness such that when a tearing force is applied to the flexible packaging in the vicinity of the line of weakness the flexible packaging tears along the line of weakness to open the flexible packaging, and
   f) further wherein the horn and anvil do not contact one another when the horn generates the ultrasonic pulse to fuse the spaced apart junctions to form the line of weakness.

2. The system according to claim 1 wherein the tearing force comprises shearing force and/or tension force.

3. The system according to claim 1 wherein the ultrasonic horn is used for generating an ultrasonic pulse of about 20 kilohertz to fuse the flexible packaging in a pattern corresponding to the pattern of protuberances.

4. The system according to claim 1 wherein the pattern of protuberances is in a substantially straight line.

5. The system according to claim 1 wherein the pattern of protuberances is curved.

6. The system according to claim 1 wherein each protuberance in the plurality of protuberances has a shape.

7. The system according to claim 6 wherein the shape comprises at least one of a dot, an X-shape, a diamond, a circle, and a polygon, and a curve.

8. The system according to claim 1 wherein the thickness of each of the horn side wall and anvil side wall is between about 1.5 mil to about 4.0 mil.

9. The system according to claim 1 wherein the horn comprises a transducer in electronic communication with a titanium booster to produce a desired ultrasonic frequency.

10. The system according to claim 1 further wherein the anvil defines a recess and the actuator comprises a rod and wherein the rod is receivable in the anvil recess.

11. The system according to claim 1 further comprising a guiding post joined to the carriage and wherein the anvil defines an opening and wherein the guiding post is positioned in the opening such that the anvil is guided by the guiding post when it is reciprocated by the actuating rod.

12. The system according to claim 1 wherein the pattern of protuberances formed in the anvil work surface is used for forming a line of weakness in the flexible packaging that extends along the spaced apart junctions.

13. A non-invasive tear mechanism for a flexible packaging for holding product, the non-invasive tear mechanism comprising:
   a) a horn side wall having an exterior surface,
   b) an anvil side wall joined to the horn side wall along a peripheral junction to form the flexible packaging,
   c) a plurality of spaced apart fused junctions formed in the flexible packaging proximal the peripheral junction and each fused junction of the plurality of spaced apart fused junctions joins the horn side wall and anvil side wall and wherein each of the plurality of spaced apart fused junctions extends a distance from the exterior surface of the horn side wall,
   d) spaces defined between the spaced apart fused junctions, the horn side wall and the anvil side wall such that when the flexible packaging is filled with product and sealed the product can move through the spaces and remain internal to the flexible packaging, and
   e) a line of weakness formed along the plurality of spaced apart fused junctions and the plurality of spaced apart fused junctions are tearable along the line of weakness such that when a force is applied to the flexible packaging in the vicinity of the line of weakness the flexible packaging tears open along the line of weakness and the flexible packaging is opened.

14. The non-invasive tear mechanism for a flexible packaging according to claim 13 wherein the plurality of spaced apart fused junctions are fluid tight and further wherein the distance is between about twenty percent and about thirty percent of the combined thickness of the horn side wall and anvil side wall.

15. The non-invasive tear mechanism for a flexible packaging according to claim 13 wherein the plurality of spaced apart fused junctions are substantially linear.

16. The non-invasive tear mechanism for a flexible packaging according to claim 13 wherein the plurality of spaced apart fused junctions have a curved shape.

17. The non-invasive tear mechanism for a flexible packaging according to claim 13 wherein the horn side wall and anvil side wall each comprise plastic film about 1.5 mil to about 4.0 mil thick.

18. The non-invasive tear mechanism for a flexible packaging according to claim 17 wherein the plastic film comprises coextruded plastic films.

19. The non-invasive tear mechanism for a flexible packaging according to claim 17 wherein the plastic film comprises polyethylene.

20. A method for making a non-invasive tear mechanism in a flexible packaging having a horn side wall and an anvil side wall that are joined and the flexible packaging for holding product, the method comprising:
   a) providing the flexible packaging with a fill opening,
   b) providing an apparatus and providing the apparatus with a horn and an anvil mounted on a carriage,
   c) providing the anvil with a work surface and providing the work surface with a pattern of protuberances,
   d) moving the flexible packaging between the horn and the anvil and moving the horn and anvil together and activating the horn and fusing the flexible packaging at each protuberance in the pattern of protuberances forming spaced apart fused junctions that form a line of weakness in the flexible packaging such that the spaced apart fused junctions extend from the flexible packaging,
   e) defining spaces between the spaced apart fused junctions, the horn side wall and the anvil side wall and filling the flexible packaging with product through the fill opening and sealing the fill opening such that when the flexible packaging is sealed the product can move through the spaces and remain internal to the flexible packaging, and
   f) applying a force to the line of weakness and opening the flexible packaging along the line of weakness.

21. The method of producing a non-invasive tear mechanism according to claim 20 wherein the activated horn generates a frequency that is in the range of about 20 kHz to about 80 kHz.

22. The method of producing a non-invasive tear mechanism according to claim 20 further comprising providing the pattern of protuberances in a substantially straight line.

23. The method of producing a non-invasive tear mechanism according to claim 22 further comprising providing the plurality of protuberances in a curved shape.

24. The method of producing a non-invasive tear mechanism according to claim 22 further comprising providing each of the protuberances with dot shape.

25. The method of producing a non-invasive tear mechanism according to claim 20 further comprising using a plastic film for the horn side wall and the anvil side wall.

26. The method of producing a non-invasive tear mechanism according to claim 25 further wherein the plastic film comprises coextruded plastic films.

27. The method of producing a non-invasive tear mechanism according to claim 26 wherein the coextruded plastic film comprises multiple layers.

28. The method of producing a non-invasive tear mechanism according to claim 25 wherein the plastic film comprises polyolefin.

29. A non-invasive tear mechanism comprising:
   a) a sealed flexible packaging,
   b) a plurality of spaced apart fused junctions provided for in the flexible packaging and a line of weakness extends along the plurality of spaced apart fused junctions, and spaces in the flexible packaging extend between the plurality of spaced apart fused junctions such that there is no opening along the line of weakness and such that the contents of the flexible packaging can move through the spaces when the flexible packaging is sealed, and
   c) the line of weakness extends along the plurality of spaced apart fused junctions such that when a tearing force is applied to the flexible packaging in the vicinity of the line of weakness the flexible packaging controllably tears along the line of weakness to open the sealed flexible packaging.

30. The non-invasive tear mechanism according to claim 29 wherein the plurality of spaced apart junctions extend a distance between about twenty percent to about thirty percent of the combined thickness of the horn side wall and the anvil side wall away from the horn side wall.

31. The non-invasive tear mechanism according to claim 29 wherein the plurality of spaced apart junctions are in a substantially straight line.

32. The non-invasive tear mechanism according to claim 29 wherein the plurality of spaced apart junctions are curved.

33. The non-invasive tear mechanism according to claim 29 wherein the flexible packaging comprises plastic.

34. The non-invasive tear mechanism according to claim 33 wherein the plastic comprises polyethylene.

35. A system for forming a non-invasive tear mechanism in a flexible packaging, the system comprising:
   a) an anvil having a work surface,
   b) a horn,
   c) a means for positioning joined to the horn and the anvil and used for moving the anvil and the horn toward and away from one another, and
   d) a pattern of protuberances formed on the anvil work surface the pattern of protuberances to form the non-invasive tear mechanism in the flexible packaging when the means for positioning moves the horn and anvil together on either side of the flexible packaging and is activated and further wherein the horn and the work surface of the anvil remain out of contact with one another when the horn is activated, such that a line of weakness is formed in the flexible packaging without any openings in the line of weakness.

36. The system according to claim 1 wherein the horn is an ultrasonic horn that generates a frequency of about 20 kHz to about 80 kHz.

37. A non-invasive tear mechanism for opening a flexible packaging, the non-invasive tear mechanism comprising:
   a) a horn side wall,
   b) an anvil side wall joined to the horn side wall along a peripheral junction to form the flexible packaging,
   c) a fill opening defined in the peripheral junction for allowing a product to be introduced into the flexible packaging,
   d) spaced apart fused junctions formed in the horn side wall and anvil side wall joining the horn side wall and anvil side wall and the spaced apart fused junctions forming a line of weakness in the flexible packaging and the line of weakness formed prior to the introduction of product through the fill opening into the flexible packaging and further wherein the spaced apart fused junctions and the line of weakness extend laterally from the peripheral junction,
   e) wherein spaces are defined between the spaced apart fused junctions, the horn side wall and the anvil side wall, and
   f) wherein the line of weakness extends along the spaced apart fused junctions and spaces such that after the line of weakness has been formed and product has been introduced into the fill opening and the fill opening has been sealed, the product housed inside the flexible packaging can communicate through the spaces yet remain internal to the sealed flexible packaging.

38. The non-invasive tear mechanism for a flexible packaging of claim 37 wherein the spaced apart fused junctions are in a pattern.

39. The non-invasive tear mechanism for a flexible packaging of claim 37 wherein the product remains internal to the flexible packaging until an end user tears open the flexible packaging along the line of weakness causing the flexible packaging to open along the line of weakness.

40. A flexible packaging for holding product, the flexible packaging comprising:
   a) a bag having a surrounding wall for housing the product therein, the bag having opposed ends with one of the opposed ends being sealed prior to introduction of product therein,
   b) the bag having spaced apart fused junctions formed in the surrounding wall such that opposed portions of the surrounding wall are joined at each of the spaced apart fused junctions and the spaced apart fused junctions form a laterally extending line of weakness in the bag,
   c) the opposed portions of the surrounding wall and the spaced apart junctions have openings therebetween such that after introduction of the product into the bag and the other of the opposed ends of the bag is sealed the product can communicate through the openings while at the same time the product cannot escape the bag, and
   d) wherein the bag is openable by a manual tearing force applied to the surrounding wall in the vicinity of the line of weakness such that the bag controllably tears open along the line of weakness.

* * * * *